US008159586B2

(12) United States Patent
Yoshida et al.

(10) Patent No.: US 8,159,586 B2
(45) Date of Patent: Apr. 17, 2012

(54) SOLID-STATE IMAGING APPARATUS

(75) Inventors: Taishin Yoshida, Atsugi (JP); Yuichi Gomi, Hachioji (JP)

(73) Assignee: Olympus Corporation, Tokyo (JP)

( * ) Notice: Subject to any disclaimer, the term of this patent is extended or adjusted under 35 U.S.C. 154(b) by 456 days.

(21) Appl. No.: 12/104,764

(22) Filed: Apr. 17, 2008

(65) Prior Publication Data

US 2008/0259195 A1 Oct. 23, 2008

(30) Foreign Application Priority Data

Apr. 20, 2007 (JP) ................................. 2007-111406

(51) Int. Cl.
*H04N 3/14* (2006.01)
*H04N 5/335* (2011.01)

(52) U.S. Cl. ........................................................ 348/308

(58) Field of Classification Search ........................ None
See application file for complete search history.

(56) References Cited

U.S. PATENT DOCUMENTS

| 6,897,429 B1 * | 5/2005 | Turner et al. ............... 250/214 R |
| 7,659,500 B2 * | 2/2010 | Purcell ........................ 250/208.1 |
| 7,732,748 B2 * | 6/2010 | Johansson .................. 250/214 R |
| 2002/0097441 A1 * | 7/2002 | Hara et al. ..................... 358/302 |
| 2004/0080646 A1 * | 4/2004 | Zhao et al. ..................... 348/302 |
| 2005/0083420 A1 * | 4/2005 | Koseki et al. ................. 348/294 |
| 2006/0011807 A1 * | 1/2006 | Lee et al. .................... 250/208.1 |
| 2007/0040915 A1 * | 2/2007 | Suzuki et al. ............. 348/222.1 |
| 2007/0139544 A1 * | 6/2007 | Egawa et al. ................ 348/308 |
| 2007/0146514 A1 * | 6/2007 | Maeda et al. ................ 348/294 |
| 2008/0143860 A1 * | 6/2008 | Sato ............................. 348/301 |

FOREIGN PATENT DOCUMENTS

JP         2003-174596 A        6/2003

* cited by examiner

*Primary Examiner* — Lin Ye
*Assistant Examiner* — Dennis Hogue
(74) *Attorney, Agent, or Firm* — Westerman, Hattori, Daniels & Adrian, LLP

(57) ABSTRACT

A solid-state imaging apparatus including: a pixel section having unit pixels arranged into a two-dimensional matrix, each unit pixel containing a photoelectric conversion section for effecting a photoelectric conversion and an amplification section for amplifying and reading signal charges generated at the photoelectric conversion section; a current supply provided for each column for flowing a bias current to the amplification section; a column processing section provided for each column for processing a signal from the amplification section column by column; an output section for sequentially reading signals processed column by column at the column processing section and outputting them to an external signal processing circuit; and a bias current controlling section for controlling the bias current of the current supply in accordance with a gain setting at the external signal processing circuit.

5 Claims, 5 Drawing Sheets

SOLID-STATE IMAGING APPARATUS

This application claims benefit of Japanese Patent Application No. 2007-111406 filed in Japan on Apr. 20, 2007, the contents of which are incorporated by this reference.

BACKGROUND OF THE INVENTION

The present invention relates to solid-state imaging apparatus, and more particularly relates to a solid-state imaging apparatus capable of reducing power consumption.

A description will be given below first by way of FIGS. 1, 2, and 3 with respect to fundamental construction and drive method of a general MOS-type solid-state imaging apparatus. FIG. 1 shows a general pixel construction used in MOS solid state imaging devices. What is denoted by numeral 100 is a unit pixel, and a plurality of unit pixels is arranged into a two-dimensional matrix to acquire image information. Shown respectively are: 101, a photodiode for effecting photoelectric conversion; 104, an amplification transistor for amplifying and reading light-generated electric charge occurring at the photodiode 101 by converting it into voltage for example by means of pn junction capacitor or gate capacitor; 102, a transfer transistor for transferring light-generated electric charge occurring at the photodiode 101 to gate terminal of the amplification transistor 104; 103, a reset transistor for resetting the gate terminal of amplification transistor 104 and the photodiode 101; and 105, a select transistor for selecting the pixel to transmit an output of the amplification transistor 104 to a vertical signal line 110.

These components but the photodiode 101 are shielded from light.

Denoted by 106 is a pixel power supply line, which is to supply a power supply voltage in common to all pixels, and is electrically connected to drain terminal of the amplification transistor 104 and drain terminal of the reset transistor 103. 107 is a row reset line for resetting pixels corresponding to one row, which is electrically connected respectively to the gate terminals of reset transistor 103 of pixels corresponding to one row. 108 is a row transfer line for transferring the light-generated electric charge of the pixels corresponding to one row to the gate terminal of amplification transistor 104 of each pixel, which is electrically connected respectively to the gate terminals of transfer transistor 102 of the pixels corresponding to one row. 109 is a row select line for selecting pixels corresponding to one row, which is electrically connected respectively to the gate terminals of select transistor 105 of the pixels corresponding to one row. With such pixel construction, a photoelectric conversion function, reset function, memory function, amplification/read function, and select function are achieved.

FIG. 2 typically shows a general fundamental construction of MOS solid-state imaging apparatus. 200 denotes a pixel section where unit pixels 100 are arranged into a two-dimensional matrix which corresponds to pixels P11 to P33. Here, for ease of explanation, the pixel section 200 is shown as 3 rows by 3 columns of unit pixels 100. 202 denotes a vertical scanning circuit section for selecting row, which sequentially outputs vertical scanning pulse φV-i (i=1, 2, 3). 203 denotes a vertical select switch section, which transmits row select pulse φSEL, row reset pulse φRS, and row transfer pulse φTX respectively to the row select line 109, row reset line 107, and row transfer line 108 of each pixel P11 to P33 in accordance with the vertical scanning pulse φV-i. While, in FIG. 2, only one line is shown as the lines for transmitting to each row the row select pulse φSEL, row reset pulse φRS, and row transfer pulse φTX, and only one unit of vertical select switch (MV-1, MV-2, MV-3) for each row is shown, these are provided respectively separately from each other.

201 denotes a current supply section where current supplies ML1, ML2, and ML3 provided for each column are respectively electrically connected to the vertical signal line 110 as described in FIG. 1. A source follower circuit is thereby formed for each column by the amplification transistor 104 and current supply ML1 to ML3. Here, the current supply ML1 to ML3 is provided with a function for causing a flow of constant bias current. 204 denotes a column processing circuit section where correlated double sampling (CDS) respectively of the pixel signals outputted from the above described source follower circuits is performed by column processing circuits CDS1, CDS2, CDS3 provided for each column. The column processing circuit CDS1 to CDS3 of each column performs signal processing such as elimination of offset variance for example of fixed-pattern noise of pixel and then stores result of the signal processing to a memory.

205 denotes a horizontal scanning circuit section for selecting column, which is to sequentially output horizontal scanning pulse φH-j (j=1, 2, 3). 206 denotes a horizontal select switch section where the signal processing result stored at the column processing circuit section 204 is transmitted to a horizontal signal line 207 in accordance with the horizontal scanning pulses φH-j. 208 denotes an amplifier for amplifying the signal processing result stored at the column processing circuit section 204 and transmitted to the horizontal signal line 207 and for outputting it to an external system.

A general drive timing of the MOS solid-state imaging apparatus having such construction will now be described by way of a timing chart shown in FIG. 3. When vertical scanning pulse φV-1 of the first row is outputted (or is driven to H level) from the vertical scanning circuit section 202, the pixels of the first row become drivable. More particularly, for the pixels of the first row: the row select pulse φSEL becomes transmittable as φSEL-1 to gate terminal of the select transistor 105 of the pixels of the first row through the vertical select switch MV-1 and row select line 109; row reset pulse φRS becomes transmittable as φRS-1 to gate terminal of the reset transistor 103 of the pixels of the first row through the vertical switch MV-1 and row reset line 107; and row transfer pulse φTX becomes transmittable as φTX-1 to gate terminal of the transfer transistor 102 of the pixels of the first row through the vertical switch MV-1 and row transfer line 108.

An operation during period Tv will now be described. First, when the vertical scanning pulse φV-1 is driven to "H" level and then row select pulse φSEL-1 to "H" level, an output of the amplification transistor 104 becomes transmittable to the vertical signal line 110. In other words, a period for reading signal and processing signal is started. Next, when the row reset pulse φRS-1 is driven to "H" level, the gate terminal of the amplification transistor 104 is reset to the level of a pixel power supply VDD. Next, the row reset pulse φRS-1 is brought to "L" level, and a reset level output outputted from the amplification transistor 104 at this time is sampled at the column processing circuit section 204.

Next, the row transfer pulse φTX-1 is driven to "H" level to transfer a light-generated electric charge accumulated at photodiode 101 to the gate terminal of the amplification transistor 104. Next, the row transfer pulse φTX-1 is brought to "L" level so as to sample again the signal level output outputted at this time at the column processing circuit section 204.

At this time, since the output of the amplification transistor 104 charges a parasitic capacitance of the vertical signal line 110 and an input capacitance of the column processing circuit section 204, a certain charging period becomes necessary for the vertical signal line 110 to attain signal level of the output of the amplification transistor 104. The charging period depends on bias current of the current supply ML1 to ML3, and becomes shorter with an increase in the bias current. The bias current is usually set to a sufficiently large value so that a signal level at the time of saturation of photodiode 101 is obtained within the period Tv.

Subsequently, a differential processing between the sampled signal level output and reset level output is performed at the column processing circuit section 204, and signals after the differential processing are respectively stored to the column processing circuits CDS1, CDS2, and CDS3. The row select signal φSEL-1 is then brought to "L" level to end the period for reading signal and processing signal. The row reset pulse φRS-1 and row transfer pulse φTX-1 are then driven to "H" level to reset the photodiode 101, and an accumulation of light-generated electric charge is subsequently started at the photodiode 101.

An operation during period Th will now be described.

When horizontal scanning pulses φH-1, φH-2, and φH-3 are sequentially outputted from the horizontal scanning circuit section 205, the signals after the differential processing stored at the column processing circuits CDS1, CDS2, and CDS3 of the column processing circuit section 204 are sequentially read out to the horizontal signal line 207 respectively through the horizontal select switches MH1, MH2, and MH3 of the horizontal select switch section 206. The signals read out to the horizontal signal line 207 are amplified at the output amplifier section 208 and are outputted to the outside system. The signal to be outputted to the outside system is indicated by Vout in FIG. 3. At this time, a suitable bias current corresponding to a signal band is supplied to the output amplifier section 208.

With the operation of the above, pixels P11, P12, and P13 corresponding to one row are read out. By sequentially performing this operation from the first row through the third row, signals of all pixels of the pixel section 200 can be read out. In particular, the pixel signals of pixels P11 to P33 of the light-receiving pixel section 200 are sequentially outputted as Vout from the output amplifier section 208. The above period is one frame period Tf and, in this description, is an accumulation period of light-generated electric charge of photodiode 101.

SUMMARY OF THE INVENTION

In a first aspect of the invention, there is provided a solid-state imaging apparatus including: a pixel section having unit pixels arranged into a two-dimensional matrix, each unit pixel containing a photoelectric conversion section for effecting a photoelectric conversion and an amplification section for amplifying and reading signal charges generated at the photoelectric conversion section; a current supply provided for each column for flowing a bias current to the amplification section; a column processing section provided for each column for processing a signal from the amplification section column by column; an output section for sequentially reading signals processed column by column at the column processing section and outputting them to an external signal processing circuit; and a bias current controlling section for controlling the bias current of the current supply in accordance with a gain setting at the external signal processing circuit.

In a second aspect of the invention, the column processing section in the solid-state imaging apparatus according to the first aspect includes a clamp means for clamping the signal from the amplification section to a reference level.

In a third aspect of the invention, the solid-state imaging apparatus according to the first aspect or the second aspect further includes a gain correction means for correcting a column-by-column gain variance of the signals from the column processing section.

In a fourth aspect of the invention, the current supply in the solid-state imaging apparatus according to any one of the first to third aspects includes MOS transistor of common source, for controlling the bias current by a voltage inputted to its gate terminal. The bias current controlling section controls the voltage inputted to the gate terminal of the MOS transistor in accordance with the gain setting at the external signal processing circuit.

In a fifth aspect of the invention, the bias current controlling section in the solid-state imaging apparatus according to any one of the first to fourth aspects effects control so as to flow the bias current corresponding to the gain setting at the external signal processing circuit in a first period for effecting a signal processing at the column processing section of the signal from the amplification section and so as not to flow the bias current in a second period different from the first period.

DESCRIPTION OF THE PREFERRED EMBODIMENTS

A description of an embodiment of the solid-state imaging apparatus according to the invention will be given below with reference to the drawings.

Figure 4:
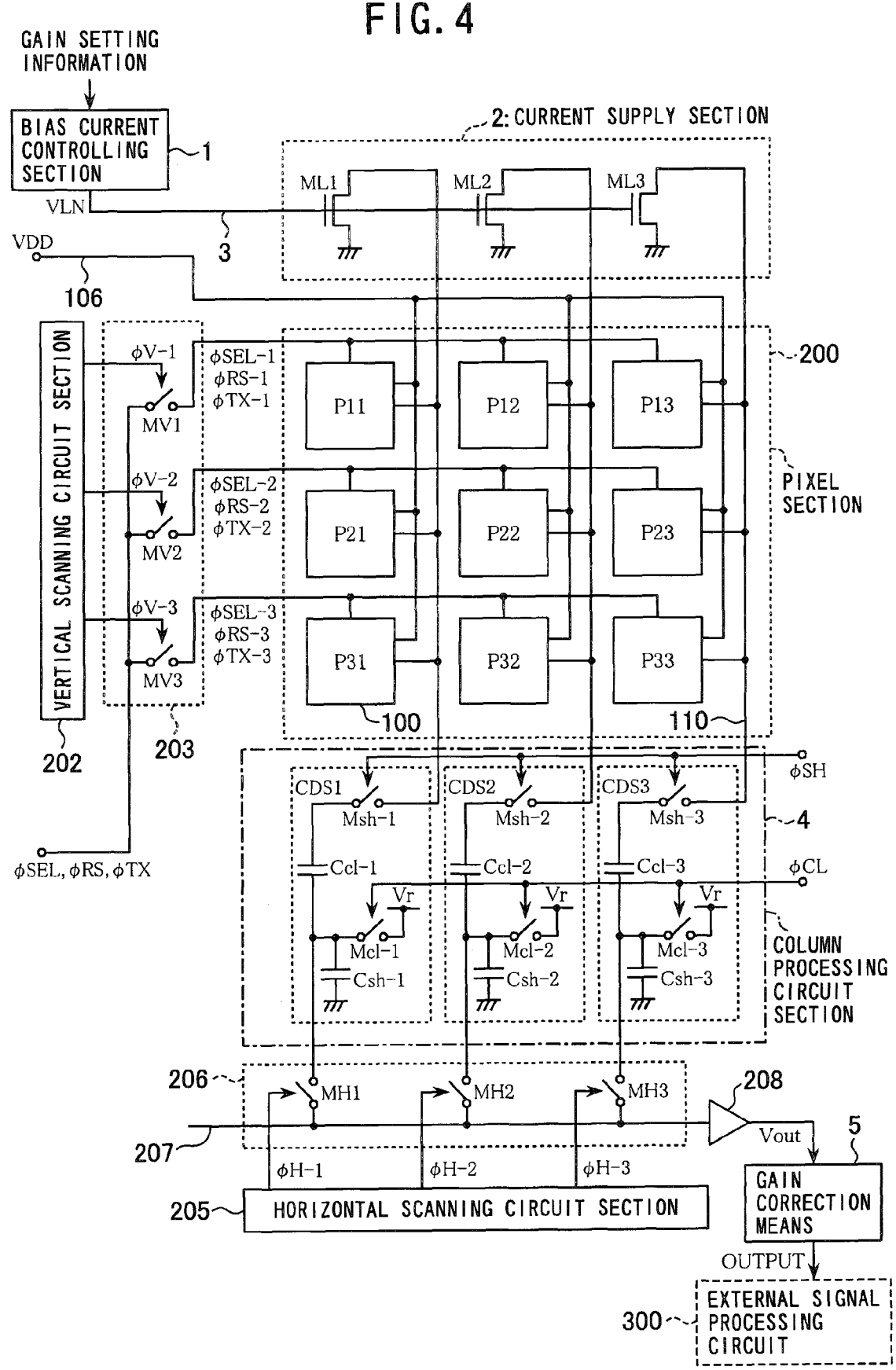
FIG. 4 is a circuit diagram showing a construction of an embodiment of the solid-state imaging apparatus according to the invention.
Figure 5:
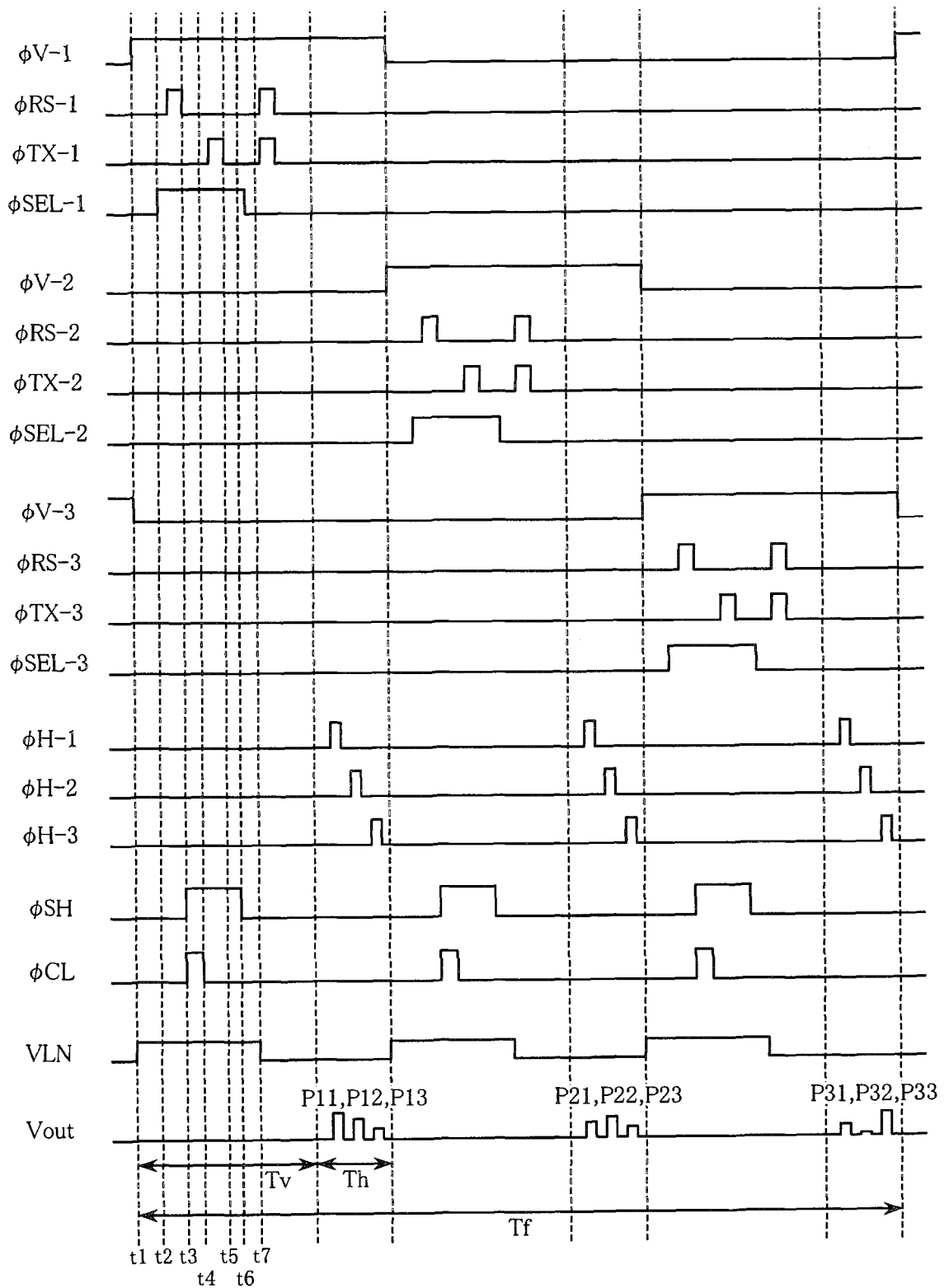
FIG. 5 is a timing chart for explaining an operation of the embodiment shown in FIG. 4.

An embodiment of the solid-state imaging apparatus according to the invention will now be described by way of FIGS. 4 and 5. FIG. 4 is a circuit diagram showing a construction of the solid-state imaging apparatus according to the present embodiment. The pixel construction of pixel used herein is identical to that shown in FIG. 1 and will not be described. Referring to FIG. 4, what is denoted by numeral 1 is a bias current controlling section which outputs a control voltage VLN for controlling bias current for a predetermined period in accordance with gain setting of an external signal processing circuit 300 which is to process output of the solid-state imaging apparatus. It should be noted that the external signal processing circuit 300 for processing output of the solid-state imaging apparatus together with the solid state imaging apparatus constitute an imaging system.

Figure 1:
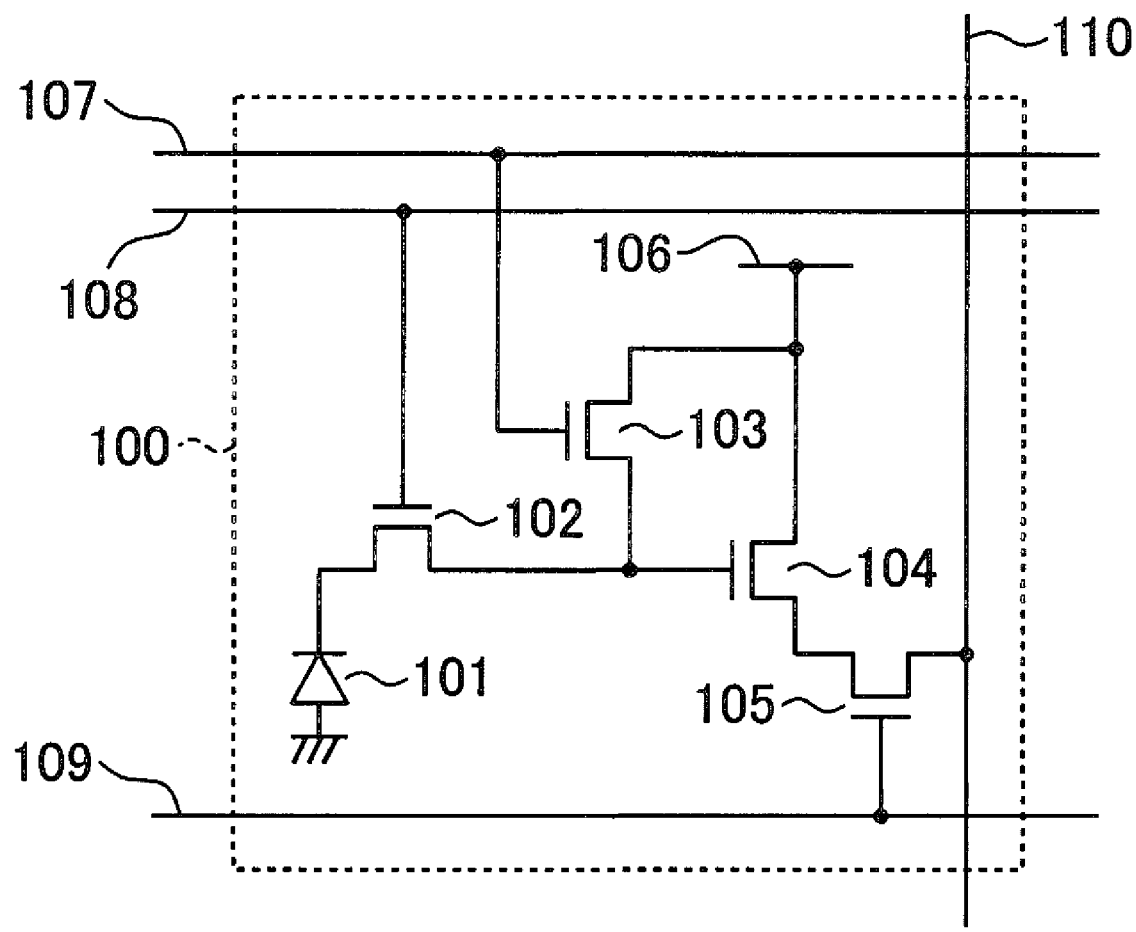
FIG. 1 is a circuit diagram showing a general pixel construction for use in MOS solid-state imaging device.

2 is a current supply section to which the current supplies ML1, ML2, and ML3 provided for each column and vertical signal line 110 described in FIG. 1 are respectively electrically connected so that a source follower circuit is formed for each column by the amplification transistor 104 of each pixel and the current supply ML1 to ML3. Here, the current supply ML1 to ML3 is formed of MOS transistor having its common source. 3 is a bias current control line which transmits a control voltage VLN, i.e. output of the bias current controlling section 1 to gate terminal of the MOS transistor that constitutes the current supply ML1 to ML3. Since a bias current of the current supply ML1 to ML3 becomes smaller with decrease in voltage value of the control voltage VLN, the control voltage VLN is set to lower level as a gain of the imaging system becomes higher.

4 is a column processing circuit section where correlated double sampling (CDS) of pixel signals outputted from the above described source follower circuit is performed respectively by the column processing circuits CDS1, CDS2, and CDS3 provided for each column, and, after effecting a signal processing such as an elimination of a fixed pattern noise of pixel, its result is stored to memory. Here, the column processing circuit CDS1 to CDS3 is formed as a clamp-type differential processing circuit and includes: a clamp switch Mcl-1 to Mcl-3 controlled by clamp pulse φCL for transmitting a reference voltage Vr to an end of clamp capacitor Ccl-1 to Ccl-3 and sample-and-hold capacitor Csh-1 to Csh-3; and a sample-and-hold switch Msh-1 to Msh-3 controlled by sample-and-hold pulse φSH for transmitting the signal from the vertical signal line 110 to an input end of clamp capacitor Ccl-1 to Ccl-3.

Figure 2:
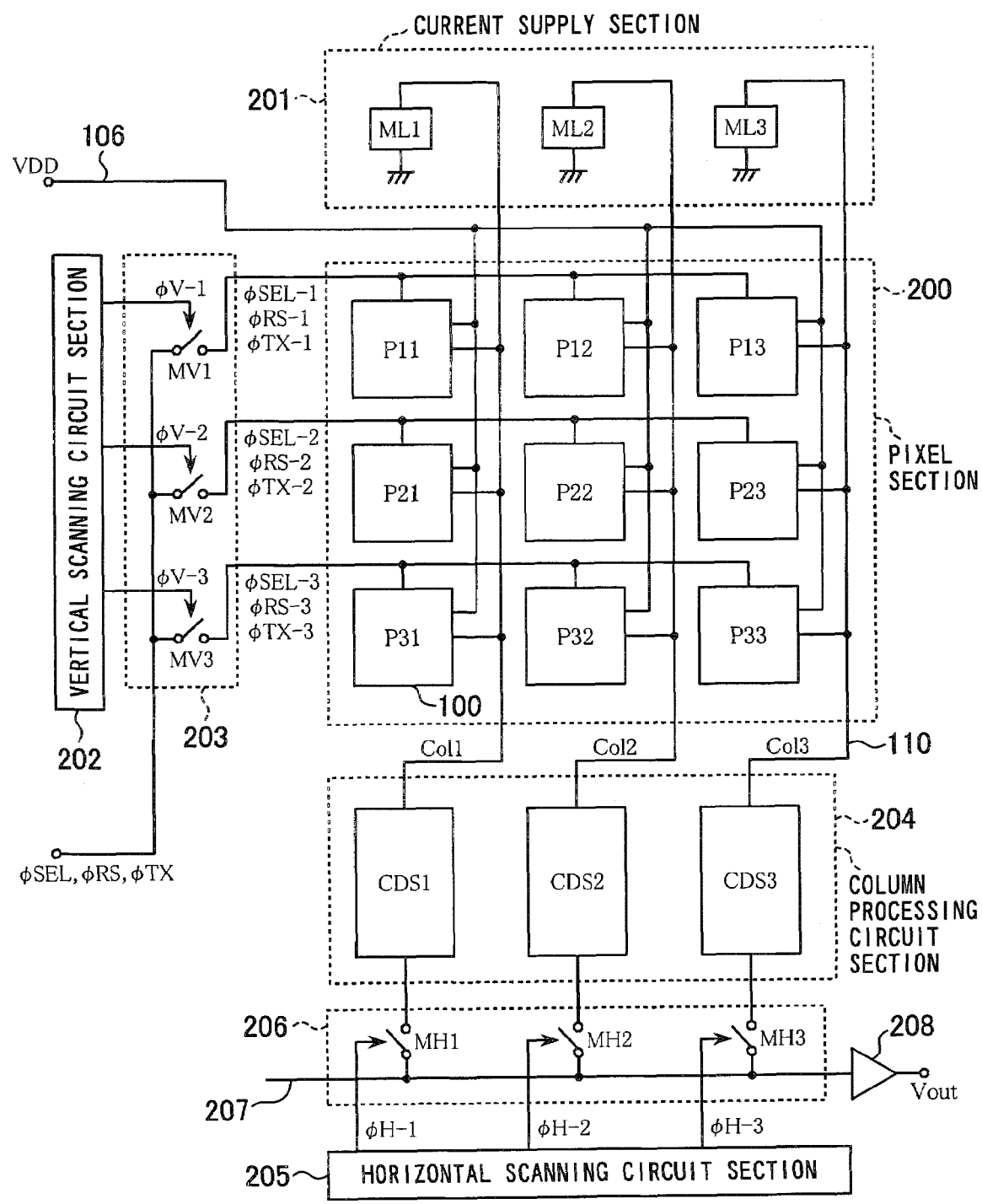
FIG. 2 is a block diagram showing a general fundamental construction of MOS solid-state imaging apparatus.
Figure 3:
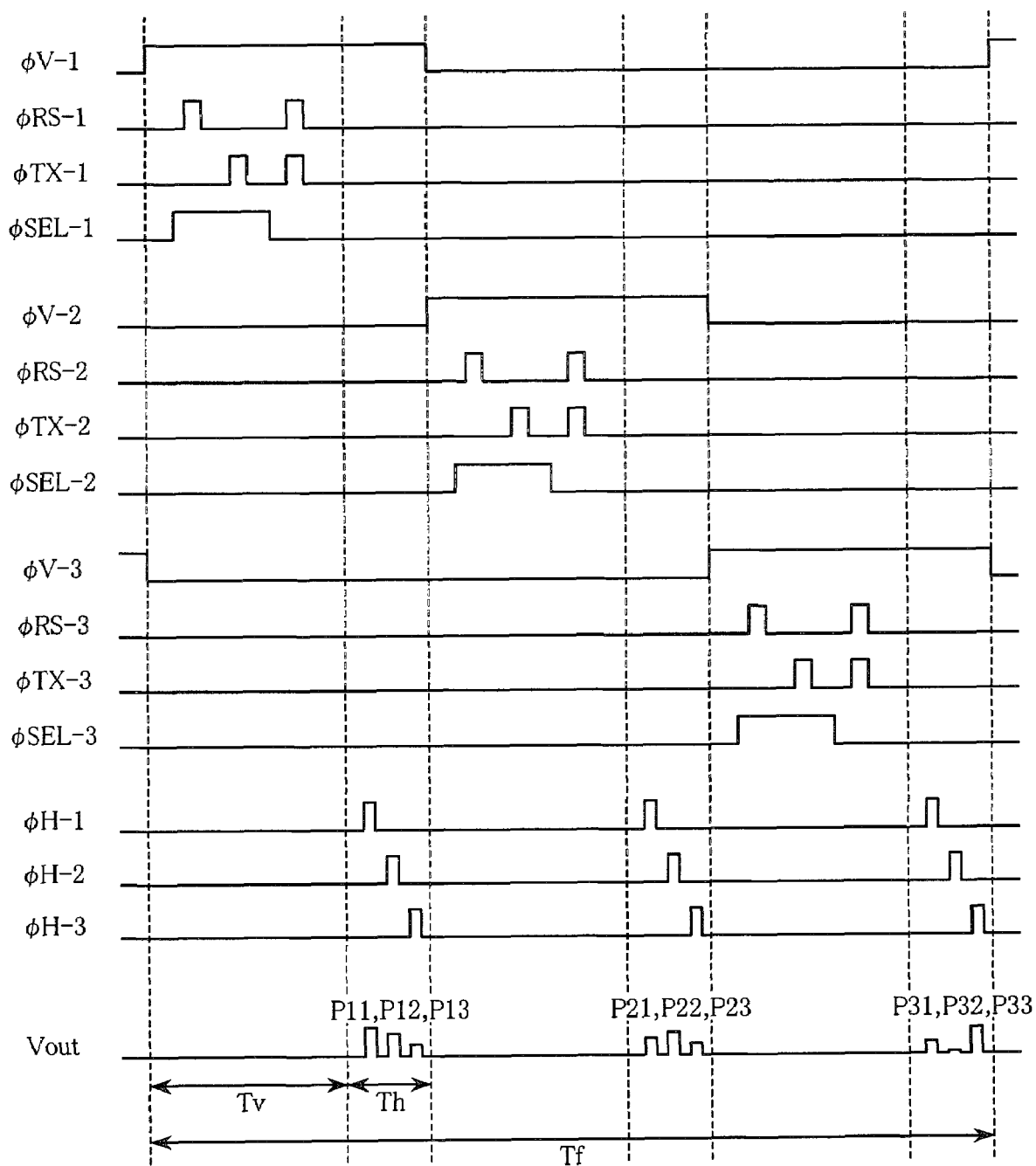
FIG. 3 is a timing chart for explaining an operation of the MOS solid-state imaging apparatus shown in FIG. 2.

5 is a gain correction means for providing an output by correcting a gain variance by each column of the signals from the column processing circuits CDS1 to CDS3. The gain correction means 5 is constructed such that gain correction factors for each column for example are retained at a line memory, and the signal inputted to the gain correction means 5 is multiplied by the gain correction factor. Further, when the gain setting of the imaging system is changed so as to change the bias current of the current supply ML1 to ML3, the above gain correction factors are also to be changed. The construction of the rest is identical to the prior-art MOS solid-state imaging apparatus shown in FIG. 2 and will not be described.

An operation of the embodiment having such construction will now be described by way of a timing chart of FIG. 5. When vertical scanning pulse φV-1 of the first row is outputted (driven to H level) from the vertical scanning circuit section 202, the pixels of the first row become drivable. More particularly, for the pixels of the first row: a row select pulse φSEL becomes transmittable as φSEL-1 to a gate terminal of the select transistor 105 of the pixels of the first row through the vertical select switch MV-1 and row select line 109; a row reset pulse φRS becomes transmittable as φRS-1 to a gate terminal of the reset transistor 103 of the pixels of the first row through the vertical switch MV-1 and row reset line 107; and a row transfer pulse φTX becomes transmittable as φTX-1 to a gate terminal of the transfer transistor 102 of the pixels of the first row through the vertical switch MV-1 and row transfer line 108.

Firstly, an operation during period Tv will be described. At time t1, the vertical scanning pulse φV-1 is driven to "H" level so that the row select pulse φSEL-1, the row reset pulse φRS-1, and the row transfer pulse φTX become transmittable. At this time, the bias current control voltage VLN corresponding to gain setting of the imaging system is outputted from the bias current control section 1. Since the current supply ML1 to ML3 thereby starts to flow a bias current, the source follower circuit formed of the amplification transistor 104 of pixel and current supply ML1 to ML3 becomes active. Next at time t2, the row select pulse SEL-1 is driven to "H" level so that an output of the source follower circuit (output of the amplification transistor 104) is transmittable to the vertical signal line 110. In other words, a period for reading pixel signal and effecting signal processing is started.

Next, when row reset pulse φRS-1 is driven to "H" level, the gate terminal of the amplification transistor 104 is reset to the level of the pixel power supply VDD. At time t3, the row reset pulse φRS-1 is brought to "L" level, and, in order to sample a reset level outputs outputted from the amplification transistor 104 at this time by means of the column processing circuit CDS1 to CDS3, the sample and hold pulse φSH and the clamp pulse φCL are driven to "H" level. Next at time t4, the clamp pulse φCL is brought to "L" to end the clamping of the reset level output. At this time, the reference voltage Vr is retained at the sample-and-hold capacitor Csh-1 to Csh-3, and a reset level based on the reference voltage Vr is retained at the clamp capacitor Ccl-1 to Ccl-3.

Next, the row transfer pulse φTX-1 is driven to "H" level to transfer a light-generated electric charge accumulated at photodiode 101 to the gate terminal of the amplification transistor 104. Then at time t5, the row transfer pulse φTX-1 is brought to "L" level to end transfer. Since the output from the amplification transistor 104 at this time is changed from the reset level to a signal level corresponding to the light-generated electric charge, a light signal component ΔV corresponding to amount of such change is transmitted to the sample-and-hold capacitor Csh-1 to Csh-3 through the clamp capacitor Ccl-1 to Ccl-3. When the sample-and-hold pulse φSH is brought to "L" level to end the sampling at time t6, a voltage changed by the amount corresponding to the light signal component ΔV from the reference voltage Vr, i.e. (Reference Voltage Vr)−(Signal ΔV) is retained at the sample-and-hold capacitor Csh-1 to Csh-3. In this manner, a differential processing of the reset level and the signal level corresponding to the light-generated electric charge is effected.

The row select signal φSEL-1 is then brought to "L" level to end the period for reading pixel signal and effecting signal processing. Subsequently, the bias current control voltage VLN is brought to 0V at time t7 to OFF the bias current so as to inactivate the source follower circuit. When the row reset pulse φRS-1 and the row transfer pulse φTX-1 are then driven to "H" level to reset the photodiode 101, an accumulation of the light-generated electric charge is started at the photodiode 101.

An operation during period Th will now be described. When horizontal scanning pulses φH-1, φH-2, and φH-3 are sequentially outputted from the horizontal scanning circuit section 205, signals after the differential processing retained at the sample-and-hold capacitor Csh-1 to Csh-3 of the column processing circuit CDS1, CDS2, and CDS3 of the column processing circuit section 4 are sequentially read out to the horizontal signal line 207 respectively through the horizontal select switches MH1, MH2, and MH3 of the horizontal select switch section 206. The signals read out to the horizontal signal line 207 are amplified at the output amplifier section 208 and are outputted as Vout to the outside. This output Vout is corrected of column-by-column gain variance by the gain correction means 5 and is outputted as signal after correction OUTPUT.

Signals of pixels corresponding to one row are read out by the above operation. By sequentially performing this operation from the first through third rows, signals of all pixels of the pixel section 200 can be read out. In other words, pixel signals of pixel P11 to P33 of the pixel section 200 are sequentially outputted after column-by-column gain correction. The above period constitutes one frame period Tf.

As has been described, the bias current controlling section 1 can be provided so as to control the bias current flowing through the current supply section 2 in accordance with gain setting of the external signal processing circuit 300 which is to process the output of the solid-state imaging apparatus. It is thereby possible to make a bias current as a minimum that is required to charge the parasitic capacitance of vertical signal line 110 and the input capacitance of the column processing circuit section 4 within a predetermined period with a signal of level of the range that can be used in the source follower circuit. Accordingly, since an excess bias current as in the prior-art MOS solid-state imaging apparatus is not caused to flow, the current consumption at the source follower circuit provided at each column can be significantly reduced. Further, by turning OFF the bias current except the period for performing the differential processing at the column processing circuit section 4, it is also possible to eliminate an unnecessary current consumption at the source follower circuit provided for each column. Naturally, though unnecessary current consumption occurs, it is also possible to continuously apply the control voltage VLN.

Further, if the bias current flowing to the current supply section 2 is changed in accordance with the gain setting of the external signal processing circuit 300, the output level of the source follower circuit is shifted. However, by providing a clamping function for the column processing circuit, the signal level of the column processing circuit can be made as an output based on reference voltage Vr even when the output level of the source follower circuit is shifted. The operating point of the circuits at subsequent stage thereby becomes constant so that it is possible to output stable image signals.

Further, if a variance occurs of the threshold voltage of MOS transistor used in the current supply ML1 to ML3, there may be case where a variance of bias current by each column is changed when the bias current value is changed in accordance with the gain setting of the external signal processing circuit 300, and, as a result, the gain of the source follower circuit varies. By providing the gain correction means 5 for correcting column-by-column variance of gain, however, it can be corrected to obtain an excellent image. Of the gain correction means 5, if, for example, a gain correcting factor table of each column is provided for each gain setting of the external signal processing circuit 300, the column-by-column variance can be suitably corrected for each gain setting of the external signal processing circuit 300. It is naturally also possible not to provide the gain correction means 5 if the amount of gain variance is smaller than allowable level.

It should be noted that various modification and change are naturally possible of the construction of the above embodiment. For example, the function and construction of the column processing circuit section 4 includes but not specifically limited to the essential correlated double sampling (CDS) function, and an amplification function and/or AD conversion function may also be provided in addition to CDS function. While only one output path is provided in the present embodiment, the number of output path is not specifically limited. Further, any construction of pixel suffices as far as it contains at least a photoelectric conversion function such as photodiode, charge-voltage conversion and amplification/read function such as amplification transistor, and reset control function such as reset transistor, and the number of wiring and the number of devices such as transistor are not specifically limited.

While pixel has been described in the above embodiment as one using n-channel MOS transistor, the construction using p-channel MOS transistor is also possible. In such a case, it suffices to reverse the magnitude of the voltage values in order to give similar explanation as n-channel MOS transistor. Further, while the control of bias current has been shown as being effected by forming the current supply ML1 to ML3 disposed column by column with MOS transistor of common source and by changing its gate voltage, it is also possible for example to provide a plurality of current supply of different bias current values for each column and to select a current supply to be used.

According to the first aspect of the invention as has been described by way of the above embodiment, since the bias current can be controlled in accordance with the gain setting of the external signal processing circuit, pixel signals can be read out by means of a bias current suitable for usable pixel signal level whereby it is possible to reduce power consumption. According to the second aspect, since pixel signals are clamped to reference level at the column processing circuit by controlling bias current even when pixel signal level is shifted, the output level from the column processing circuit is not shifted whereby it is possible not only to reduce power consumption but also to obtain stable image signals. According to the third aspect, even when a variance in bias current of each column occurs so that a gain of the amplification section of pixel is varied from one column to another, it is possible to correct its variance by controlling bias current. It is therefore possible not only to reduce power consumption but also to obtain excellent image signal. According to the fourth aspect, since the bias current can be controlled in accordance with gain setting with using simple construction, a circuit size does not increase and power consumption can be reduced. According to the fifth aspect, since a bias current suitable for usable pixel signal level can be caused to flow only for a necessary period, a further reduction of power consumption becomes possible.

What is claimed is:

1. A solid-state imaging apparatus comprising:
    a pixel section having unit pixels arranged into a two-dimensional matrix, each unit pixel including a photoelectric conversion section for effecting a photoelectric conversion and an amplification section for amplifying and reading signal charges generated at said photoelectric conversion section;
    a current supply provided for each column for flowing a bias current to said amplification section;
    a column processing section provided for each column for processing a signal from said amplification section column by column;
    an output section for sequentially reading signals processed column by column at said column processing section and outputting them to an external signal processing circuit; and
    a bias current controlling section for reducing said bias current of said current supply as a gain setting at said external signal processing circuit is increased.

2. The solid-state imaging apparatus according to claim 1, wherein said column processing section comprises a clamp means for clamping said signal from said amplification section to a reference level.

3. The solid-state imaging apparatus according to claim 1 further comprising a gain correction means for correcting a column-by-column gain variance of said signals from said column processing section.

4. The solid-state imaging apparatus according to claim 1, wherein said current supply comprises MOS transistor of common source for changing said bias current by a voltage inputted to its gate terminal, said bias current controlling section changing said voltage inputted to the gate terminal of said MOS transistor in accordance with the gain setting at said external signal processing circuit.

5. The solid-state imaging apparatus according to claim 1, wherein said bias current controlling section effects control so as to flow said bias current corresponding to the gain setting at said external signal processing circuit in a first period for effecting a signal processing at said column processing section of said signal from said amplification section and so as to flow no bias current in a second period different from said first period.

* * * * *